United States Patent

Kinoshita

[11] Patent Number: 6,044,947
[45] Date of Patent: Apr. 4, 2000

[54] ONE-WAY CLUTCH

[75] Inventor: Yoshio Kinoshita, Shizuoka-ken, Japan

[73] Assignee: NSK-Warner K.K., Tokyo, Japan

[21] Appl. No.: 09/228,424

[22] Filed: Jan. 12, 1999

[30] Foreign Application Priority Data

Jan. 12, 1998 [JP] Japan .................................. 10-014737

[51] Int. Cl.[7] .................................................. F16D 41/07
[52] U.S. Cl. ........................................ 192/45.1; 192/41 A
[58] Field of Search ................................ 192/45.1, 41 A; 188/82.8

[56] References Cited

U.S. PATENT DOCUMENTS

| | | | |
|---|---|---|---|
| 2,731,122 | 1/1956 | Dodge | 192/45.1 |
| 3,049,205 | 8/1962 | Ferris et al. | 192/45.1 |
| 4,360,093 | 11/1982 | Wakabayashi et al. | 192/41 A |
| 5,291,978 | 3/1994 | Numata | 192/45.1 |
| 5,372,227 | 12/1994 | Kinoshita et al. | 192/45 |
| 5,758,755 | 6/1998 | Igari | 192/45.1 |

*Primary Examiner*—Richard M. Lorence
*Attorney, Agent, or Firm*—Evenson, McKeown, Edwards & Lenahan, PLLC

[57] ABSTRACT

A one-way clutch comprises plural sprags to be arranged between an outer ring and an inner ring and at least one retainer holding the sprags in place. The retainer is provided with sprag windows for the sprags. At least one indentation is formed in an edge of each of the sprag windows, said edge extending in a peripheral direction of the retainer, so that the edge is maintained at the indentation thereof out of contact with an opposing end face of the associated one of the sprags.

9 Claims, 8 Drawing Sheets

ONE-WAY CLUTCH

BACKGROUND OF THE INVENTION a) Field of the Invention

This invention relates to a sprag-type one-way clutch, which is adapted to be mounted between a driving shaft and a driven shaft in an automotive vehicle, general industrial equipment or the like so that motive power of rotation of the driving shaft, said rotation being only in one direction, can be transmitted to the driven shaft.

b) Description of the Related Art

A sprag-type one-way clutch is mounted between a driving shaft and a driven shaft and by way of sprags arranged between an outer ring and an inner ring, transmits rotational force of one direction from the driving shaft to the driven shaft.

When the rotational force of the one direction is applied from the driving shaft to the sprags, the sprags are wedged between the outer ring and the inner ring so that torque is transmitted to the driven shaft. Upon application of rotational force of an opposite direction, however, the sprags remain unwedged between the outer ring and the inner ring so that no transmission of torque takes place between the driving shaft and the driven shaft.

Depending primarily upon the manner of holding of sprags, these sprag-type one-way clutches can be classified into three types, that is, the single cage type, the wire cage type and the double cage type.

A description will hereinafter be made of the constructions of one-way clutches of the respective types.

A conventional one-way clutch 60 of the single cage type will be described while making reference to FIGS. 1A through 1C for the sake of convenience.

The one-way clutch 60 comprises plural sprags 13, which are to be wedged between an outer ring 21 and an inner ring 22, and a retainer 15 arranged between the outer ring 21 and the inner ring 22 and holding the sprags 13 in place.

The retainer 15 is composed of a cylindrical part 18 and a flange 17. Sprag windows 19 for the sprags 13 are formed in the cylindrical part 18. The flange 17 is formed in an elliptical or oval shape having a short-diameter portion and a long-diameter portion.

A ring-shaped spring 16 is fitted beforehand on the cylindrical part 18 of the retainer 15. When the sprags 13 are inserted in the sprag windows 19 of the cylindrical part 18 and the spring 16 is fitted in spring-receiving slots formed in the sprags 13, the sprags 13 are held in the sprag windows 19 under pressing force of the spring 16.

As has been described above, the conventional one-way clutch 60 has substantially the same construction as a one-way clutch 10 according to a first embodiment of the present invention except that the conventional one-way clutch 60 is different in the shape of the sprag windows formed in the retainer from the one-way clutch 10.

To show this difference more clearly, a side view of the conventional one-way clutch 60 of the single cage type is illustrated in FIG. 6.

If any one of the sprags 13 begins to move in an axial direction of a cylindrical part 68, one of side faces of the sprag 13, said one side face being on a side of the moving direction of the sprag 13, comes into contact with the corresponding one of two edges 692,692 out of four edges of the associated sprag window 69 formed in the retainer 65, said two edges 692,692 extending in a peripheral direction of the cylindrical part 68, so that the sprag 13 is prevented from moving in the axial direction of the cylindrical part 68.

A description will next be made of a conventional one-way clutch 70 of the wire cage type.

FIGS. 7A and 7B illustrate at numeral 70 the conventional one-way clutch of the wire cage type as assembled between an outer ring 21 and an inner ring 22. FIG. 7A is a front view of the conventional one-way clutch 70 of the wire cage type, while FIG. 7B is a vertical cross-sectional view of the same conventional one-way clutch 70 taken in the direction of arrows VIIB—VIIB of FIG. 7A.

A retainer 75 employed in this one-way clutch 70 has been formed by bending a wire in a square-U zig-zag endless form so that said wire alternately extends in an axial and peripheral directions of the retainer 75. Each sprag 13 is arranged and held in place in a sprag window which is formed of two axially-extending adjacent portions of the wire and one peripherally-extending portion of the wire, said peripherally-extending portion connecting the axially-extending portions with each other at their proximal ends.

The one-way clutch 70 is constructed by arranging the sprags 13 in the retainer 75, fitting a spring 16 in spring-receiving slots formed in the sprags 13, and the arranging two side plates 72,74 on opposite sides of the sprags 13.

Depending on which side each sprag 13 moves toward in the axial direction, one of the side faces of the sprag 13, said one side face being on a side of the moving direction of the sprag 13, comes into contact at substantially the entire area thereof with the opposing one of the side plates 72,74 (see FIG. 7B).

Finally, a conventional one-way clutch 80 of the double cage type will be described while making reference to FIGS. 4A, 4B, 5A and 5B for the sake of convenience.

The one-way clutch 80 is different in the shape of sprags and the sprag-holding structure from the above-described one-way clutch of the single cage type.

The one-way clutch 80 is constructed by holding sprags 43 in place by an outer retainer 87 shown in FIG. 8A, an inner retainer 88 depicted in FIG. 8B and a ribbon spring 50 illustrated in FIGS. 5A and 5B.

As is shown in the perspective view of FIG. 5A, the ribbon spring 50 is provided with windows formed as spaces by side bars 54, which extend in a lengthwise direction and include plural wrinkles 540 formed at equal intervals, and also by cross bars 52 extending in a widthwise direction. A wrinkle 520 extends from a central portion of each cross bar 52 and terminates in a tab 522.

FIG. 5B is a perspective view, which illustrates the sprags 43 assembled in the ribbon spring 50 shown in FIG. 5A.

When each sprag 43 with a constricted portion formed in a central part thereof is assembled in one of the windows of the ribbon spring 50, the constricted portion of the sprag 43 is brought into contact with the tab 522 of the wrinkle 520 so that the sprag 43 is urged by the wrinkle 520 via the tab 522.

The sprags 43, which are in a state assembled in the ribbon spring 50, is held by the retainers 87,88 which will be described below.

Incidentally, the outer retainer 87 is provided with resilient pieces (not shown) at several locations on an outer peripheral portion of the outer retainer 87. Resilient engagement of the resilient pieces with an inner peripheral portion of the outer ring produces drag torque.

In FIG. 4B, numerals 94,96 indicate a pair of end bearings.

FIGS. 8A and 8B are side views of the outer retainer 87 and inner retainer 88 for use in the conventional one-way clutch 80 of the double cage type.

The sprags 43 are held in sprag windows 870,880, which are formed in the outer retainer 87 and inner retainer 88, respectively.

Each of the above-described one-way clutches 60,70,80 is used by assembling it between the outer ring 21 and the inner ring 22 in such a way that the inner ring 22 is located inside the retainer or retainers and the outer ring 21 is located outside the retainer or retainers.

Each of the above-described one-way clutches of the single cage type, wire cage type and double cage type is designed so that an oil film of lubricating oil is formed at an area of contact between each edge of each sprag window of each retainer and its associated sprag or between each side plate and each sprag to produce frictional force by way of the oil film. This frictional force acts as resistance when a relative motion takes place between the retainer or retainers and the sprags or between the side plates and the sprags. It is therefore necessary to set the biasing force of the spring member at a high level in view of the resistance. As a result, excess drag torque is unavoidably produced during a slip of the clutch, leading to a problem in that the fuel economy of an automobile or a motorcycle is deteriorated.

Further, a large area of contact between each sprag and each edge of its corresponding sprag window or a large area between each sprag and each side plate tends to develop wearing at the contact area, leading to a problem in that the durability of the clutch is reduced.

The above problems tend to arise especially at low temperatures where the viscosity of the oil film becomes higher.

SUMMARY OF THE INVENTION

An object of the present invention is to solve or lessen the above-described problems of the conventional one-way clutches and to provide a one-way clutch which does not produce excess drag torque during a slip and which has lower tendency of development of wearing at a contact area between each sprag and each edge of its corresponding sprag window or between each sprag and each side wall.

In one aspect of the present invention, there is thus provided a one-way clutch, which comprises plural sprags to be arranged between an outer ring and an inner ring and at least one retainer holding the sprags in place. The retainer is provided with sprag windows for the sprags. At least one indentation is formed in an edge of each of the sprag windows, said edge extending in a peripheral direction of the retainer, so that the edge is maintained at the indentation thereof out of contact with an opposing end face of the associated one of the sprags.

In a preferred embodiment, the one-way clutch is provided with one retainer. Each of the sprag windows in the retainer is in a quadrilateral shape, and has first opposing edges extending in the peripheral direction of the retainer and second opposing edges extending in an axial direction of the retainer. Two indentations are formed at an interval therebetween in each of the first opposing edges.

In another preferred embodiment, the one-way clutch is provided with two retainers. Each of the sprag windows in each of the retainers is in a quadrilateral shape, and has first opposing edges extending in the peripheral direction of the retainer and second opposing edges extending in an axial direction of the retainer. Two indentations are formed at an interval therebetween in each of the first opposing edges.

As the indentation or indentations are formed in each sprag window of each retainer, each end face of the corresponding sprag is maintained out of contact with the indentation or indentations so that the sprag is held in place while being allowed to come into contact with only portions of edges of the corresponding sprag window. Friction by way of an oil film between each sprag and the corresponding sprag window is therefore reduced. The one-way clutch is therefore provided with improved durability. Further, owing to the reduced friction, it is no longer necessary to set the biasing force of a spring member at such a high level as that required for conventional one-way clutches. As a result, smaller drag torque is produced during a slip of the clutch, thereby bringing about an improvement in fuel economy.

In another aspect of the present invention, there is also provided a one-way clutch, which comprises plural sprags to be arranged between an outer ring and an inner ring, a retainer made of a wire bent in a square-U zig-zag form so that the wire alternately extends in an axial and peripheral directions of the retainer to form sprag windows, said retainer holding the sprags in the sprag windows, respectively, and side plates arranged on opposite sides of the retainer as viewed in the axial direction of the retainer. Corresponding to each of the sprags, at least one protrusion is formed on an inner wall of at least one of the side plates, said inner wall being located opposite to the sprags, so that the protrusion extends toward the corresponding sprag.

In this construction, each end face of each sprag comes into contact with only the corresponding protrusion formed on the inner wall of the corresponding side wall, so that friction by way of an oil film between each sprag and the corresponding side wall is therefore reduced. The one-way clutch is therefore provided with improved durability. Further, owing to the reduced friction, it is no longer necessary to set the biasing force of a spring member at such a high level as that required for conventional one-way clutches. As a result, smaller drag torque is produced during a slip of the clutch, thereby bringing about an improvement in fuel economy.

BRIEF DESCRIPTION OF THE DRAWINGS

FIGS. 1A through 1C illustrate a one-way clutch of the single cage type according to one embodiment of the present invention, in which FIG. 1A is a front view of the one-way clutch as assembled between an outer ring and an inner ring, FIG. 1B is a vertical cross-sectional view of the one-way clutch taken in the direction of arrows IB—IB of FIG. 1A, and FIG. 1C is a side view of the one-way clutch;

FIGS. 3A and 3B show a one-way clutch of the wire cage type according to a third embodiment of the present invention, in which FIG. 3A is a front view of the one-way clutch as assembled between an outer ring and an inner ring and FIG. 3B is a vertical cross-sectional view of the one-way clutch taken in the direction of arrows IIIB—IIIB of FIG. 3A;

FIGS. 4A through 4D depict a one-way clutch of the double cage type according to a fourth embodiment of the present invention, in which FIG. 4A is a front view of the one-way clutch as assembled between an outer ring and an inner ring, FIG. 4B is a vertical cross-sectional view of the one-way clutch taken in the direction of arrows IVB—IVB of FIG. 4A, and FIGS. 4C and 4D are side views of an outer retainer and inner retainer used in the one-way clutch, respectively;

FIGS. 5A and 5B show a ribbon spring and sprags used in the one-way clutch according to the fourth embodiment of the present invention, in which FIG. 5A is a perspective view of the ribbon spring and FIG. 5B is a perspective view of the ribbon spring with the sprags assembled therein;

FIGS. 7A and 7B illustrate a conventional one-way clutch of the wire cage type, in which FIG. 7A is a front view of the one-way clutch as assembled between an outer ring and an inner ring and FIG. 7B is a vertical cross-sectional view of the one-way clutch taken in the direction of arrows VIIB—VIIB of FIG. 7A.

DETAILED DESCRIPTION OF THE PREFERRED EMBODIMENTS

Figure 1A:
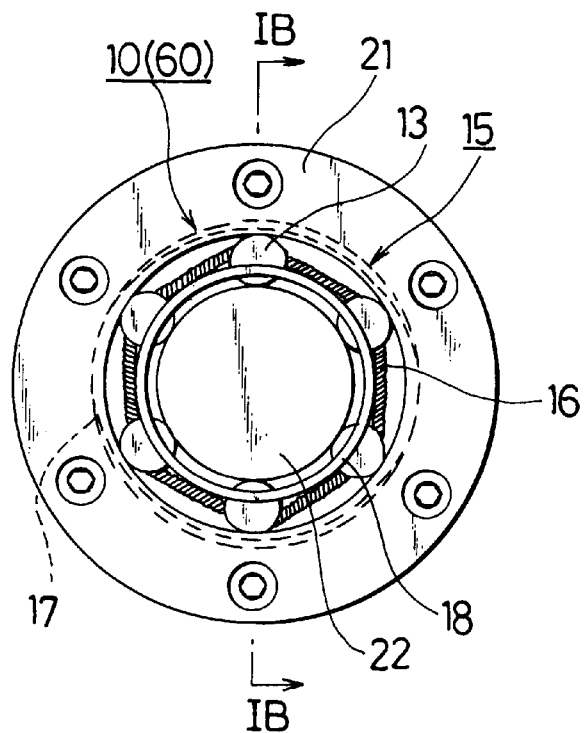
Figure 1B:
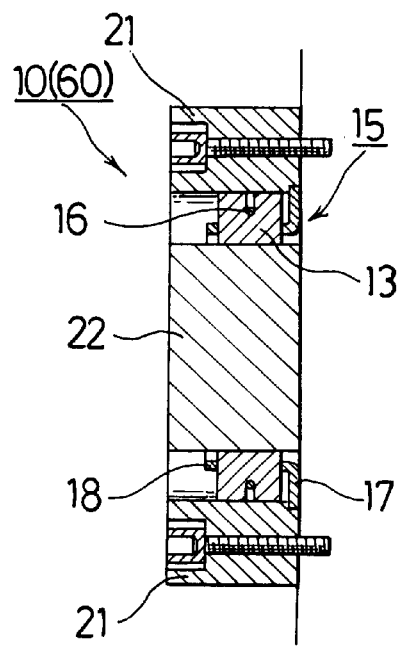
Figure 1C:
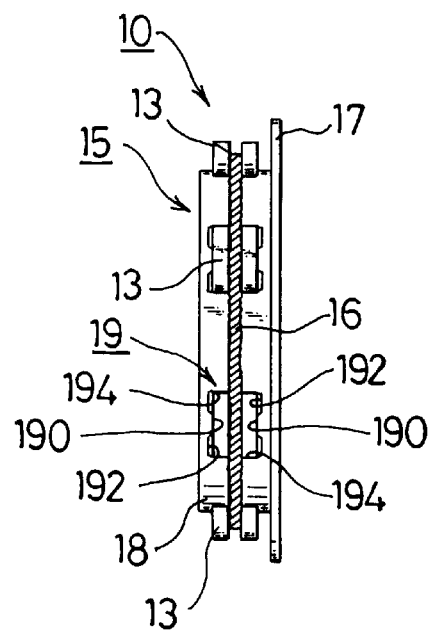

Referring first to FIGS. 1A through 1C, the one-way clutch of the single cage type according to the first embodiment of the present invention will be described.

This one-way clutch, which is generally indicated at numeral 10, is similar to the conventional one-way clutch of the single cage type except for the construction of a retainer 15 which holds sprags 13 in place, so that a description of elements other than the retainer 15 is omitted herein.

In a cylindrical part 18 of the retainer 15, sprag windows 19 are formed. Each sprag window 19 is defined by a pair of edges 190,190 extending in a peripheral direction of the cylindrical part 18 and a pair of edges 194,194 extending in an axial direction of the cylindrical part 18. In each of the paired edges 190,190 extending in the peripheral direction of the sprag window 19, two indentations 192,192 are formed to maintain the edge 190 out of contact at the indentations with an opposing end face of the associated sprag 13 (see FIG. 1C).

Figure 6:
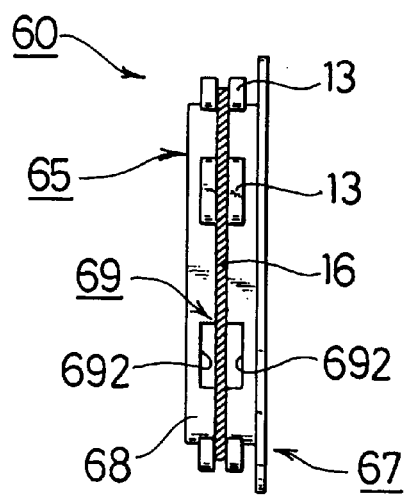
FIG. 6 is a side view of a conventional one-way clutch of the single cage type.

When each sprag 13 is held in the corresponding sprag window 19, the sprag 13 is prevented from moving in the axial direction by portions of the edges 190,190 other than the indentations 192. Compared with the conventional one-way clutch of the single cage type (see FIG. 6), the area of contact between the edges of each sprag window 19 and the associated sprag 13 is reduced. In the illustrated embodiment, the area of contact is as small as about one third of that in the conventional one-way clutch of the single cage type.

Figure 2:
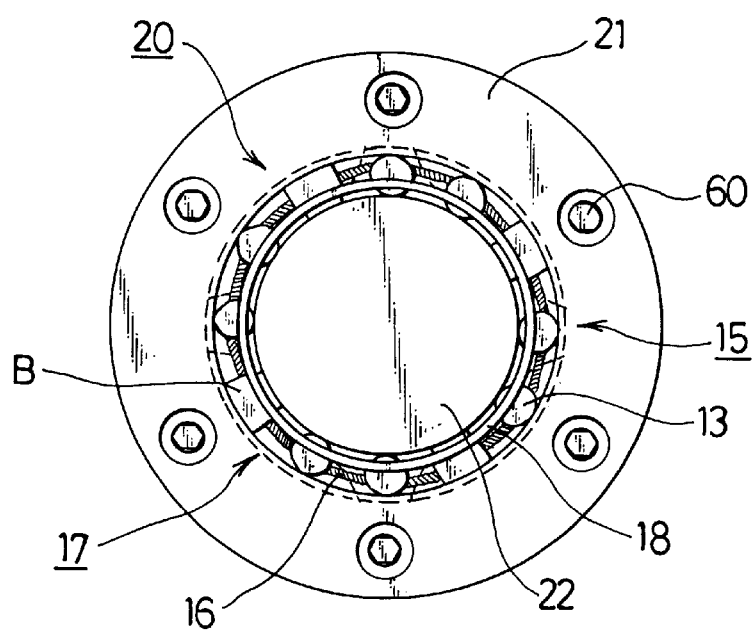
FIG. 2 is a front view of a one-way clutch according to a second embodiment of the present invention.

Referring next to FIG. 2, the one-way clutch according to the second embodiment of the present invention will be described.

The one-way clutch, which is generally designated at numeral 20, additionally includes block bearings B, as bearings between an outer ring 21 and an inner ring 22, in the construction of the above-described one-way clutch 10 of the single cage type.

As elements of the one-way clutch 20 other than the block bearings B are similar to the corresponding elements in the first embodiment of the present invention, their description is omitted herein. Incidentally, a practical example of one-way clutches equipped with such block bearings is disclosed in U.S. Pat. No. 5,372,227 issued Dec. 13, 1994 and assigned to the same assignee as the present invention, which is incorporated herein by reference.

Figure 3A:
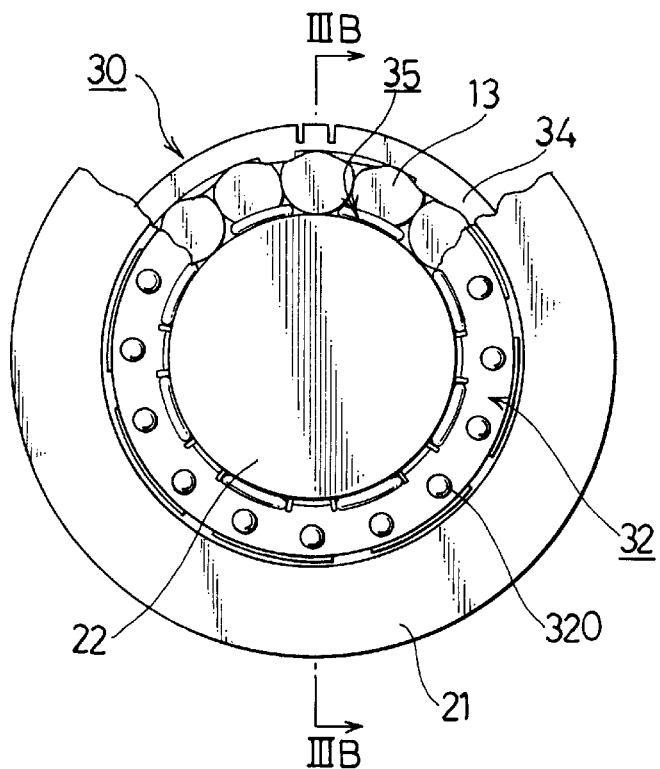
Figure 3B:
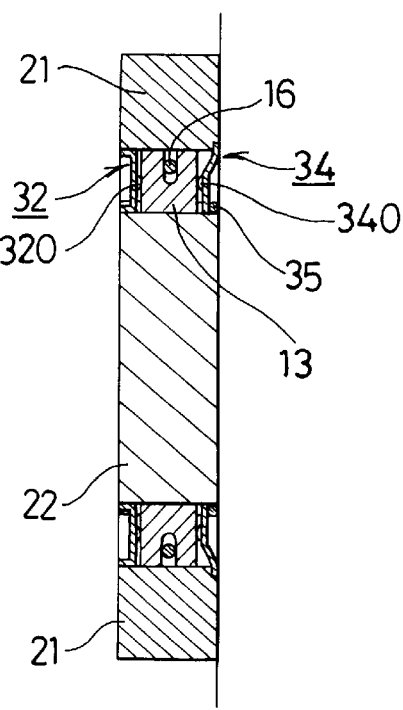

With reference to FIGS. 3A and 3B, a description will next be made of the one-way clutch of the wire cage type according to the third embodiment of the present invention, which is designated generally at numeral 30.

As elements of the one-way clutch 30 other than side plates are similar to the corresponding elements of the conventional one-way clutch of the wire cage type, their description is omitted herein.

Each of the side plates 32,34 is provided with plural protrusions 320 or 340, which extend toward opposing side faces of the associated sprags 13.

When the above-described side plates 32,34 are fitted on a wire cage 35 in which the plural sprags 13 have been arranged, the opposite side faces of the sprags are maintained out of contact with the side plates 32,34 at areas other than the corresponding protrusions 320,340.

Figure 7A:
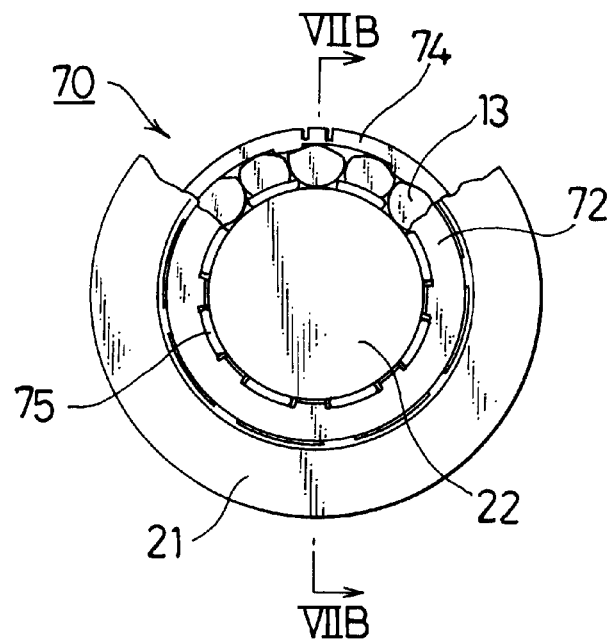
Figure 7B:
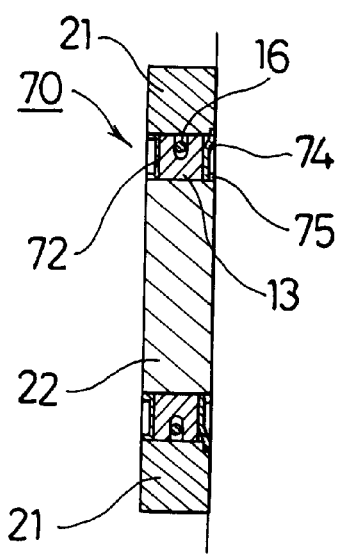
Figure 8A:
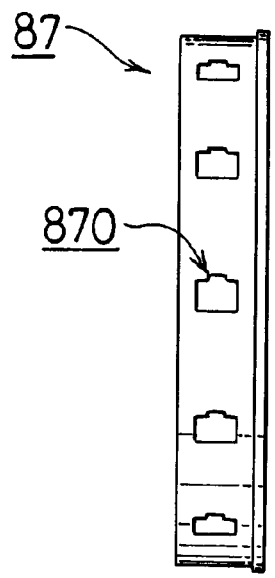
FIGS. 8A and 8B are side views of an outer retainer and inner retainer used in a conventional one-way clutch of the double cage type, respectively.
Figure 8B:
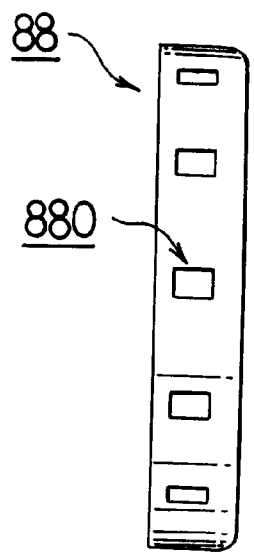

As is illustrated in FIG. 3B, each sprag 13 in this one-way clutch 30 comes into contact with the side plates 32,34 only at the corresponding protrusions 320,340. Compared with the conventional one-way clutch of the wire cage type (see FIG. 7B), the area of contact between each sprag 13 and the side plates 32,34 is significantly reduced. Specifically, it can be reduced to about one tenth or so.

Figure 4A:
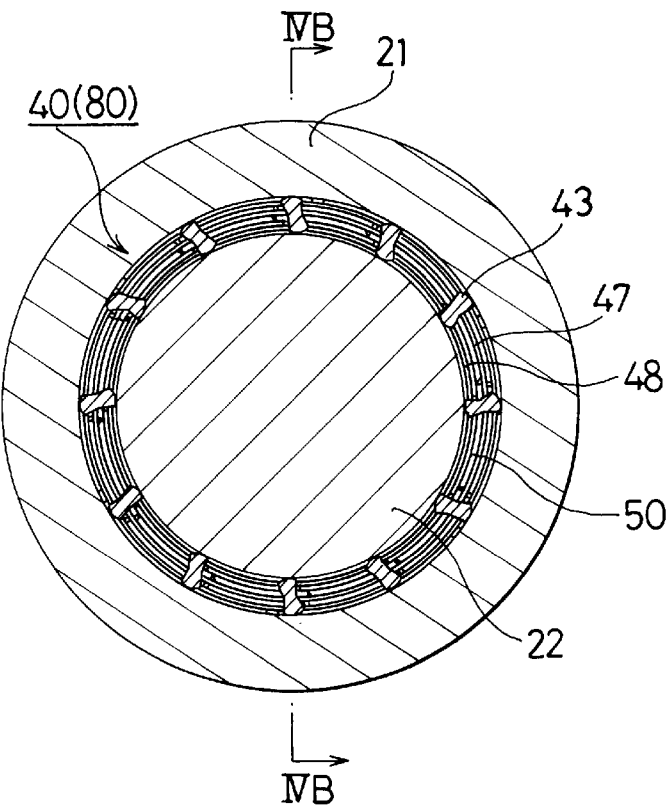
Figure 4B:
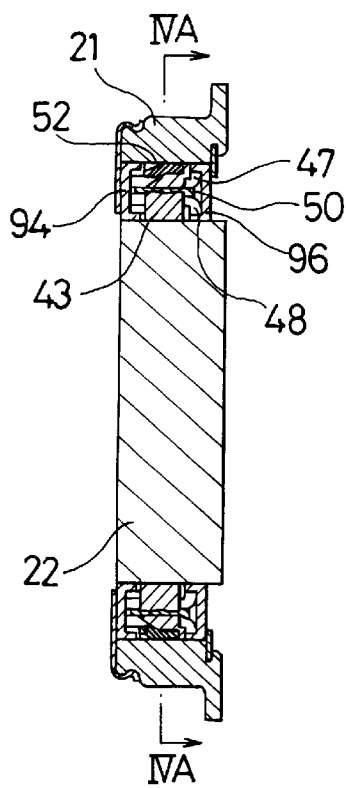
Figure 4C:
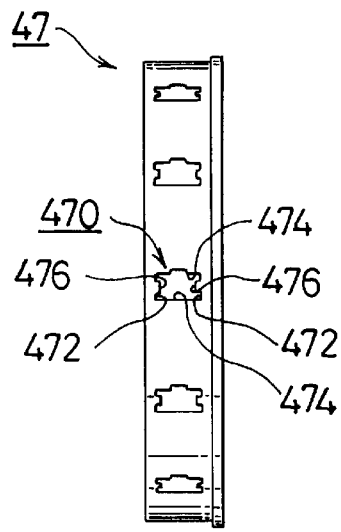
Figure 4D:
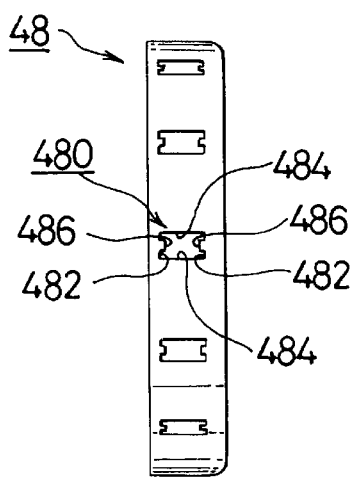
Figure 5A:
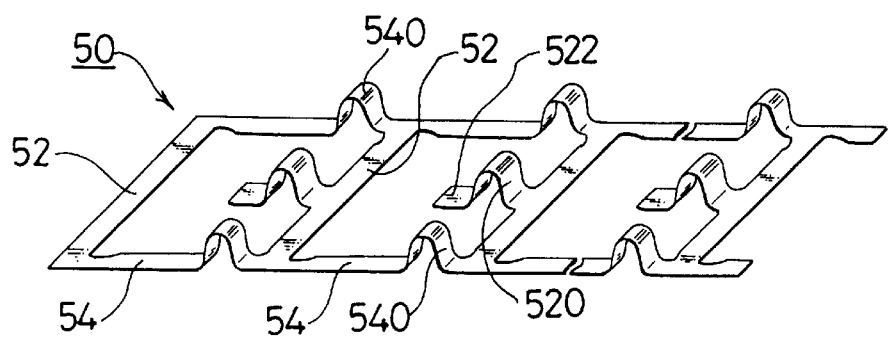
Figure 5B:
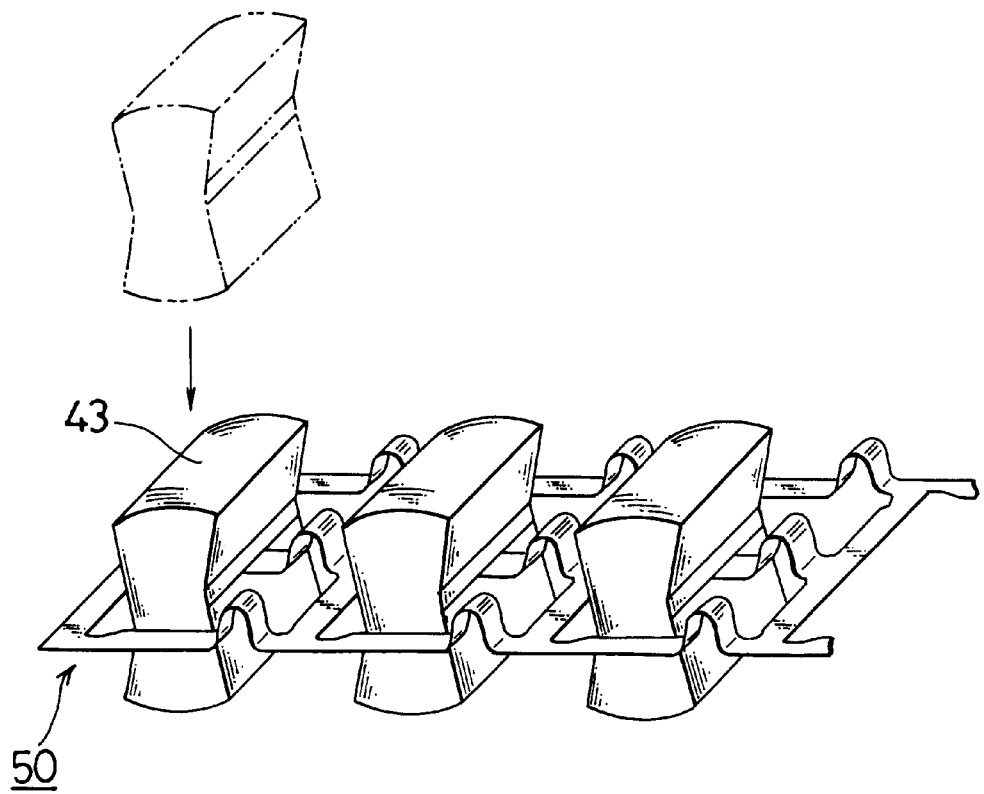

Referring next to FIGS. 4A through 4C, a description will be made of the one-way clutch of the double cage type according to the fourth embodiment of the present invention, which is generally designated at numeral 40.

As elements of the one-way clutch 40 other than an outer retainer 47 and an inner retainer 48 are similar to the corresponding elements of the conventional one-way clutch of the double cage type, their description is omitted herein.

Each of the outer retainer 47 and inner retainer 48 is provided with a cylindrical part, through which sprag windows 470 or 480 are formed. Each sprag window 470 or 480 is defined by a pair of edges 476 or 486 extending in a peripheral direction of the cylindrical part and a pair of edges 474 or 484 extending in an axial direction of the cylindrical part.

In each of the paired edges 476 or 486 of each sprag window, said paired edges extending in the peripheral direction of the corresponding cylindrical part, indentations 472 or 482 are formed at an angular interval therebetween.

When each sprag 43 is held in the associated sprag window 470 or 480 of the corresponding retainer 47 or 48, the sprag 43 is maintained out of contact with the indentations 472,482 formed in the retainer 47 or 48. Compared with the conventional one-way clutch of the double cage type, the area of contact between the sprag 43 and the edges 476 or 486 of the associated sprag window 470 or 480, said edges extending in the peripheral direction, is reduced. In the illustrated embodiment, the area of contact is as small as about one third or so of that in the conventional one-way clutch of the double cage type.

In the above-described fourth embodiment of the present invention, the indentations 472,482 are formed in the edges 476 and 486 of the sprag windows 470,480 in both of the outer retainer 47 and inner retainer 48. However, the sprag windows 470 or 480 of only one of the outer retainer 47 and inner retainer 48 may be provided with such indentations.

In each of the above-described one-way clutch 10 of the single cage type and one-way clutch 40 of the double cage type, the friction-reducing effect can be enhanced by forming the indentations in each of the edges of each sprag window 19, 470 or 480 in such a way that the resulting protrusion is located as close to a center of rocking of the associated sprag 13, which rocks in the sprag window, as possible, in other words, is located at or adjacent to the center of rocking of the associated sprag 13.

In the one-way clutch 30 of the wire cage type, it is desired to arrange each protrusion 320 or 340 on the corresponding side plate 32 or 34 so that the protrusion 320 or 340 is located as close to a center of rocking of the associated sprag 13 as possible, in other words, is located at or adjacent to the center of rocking of the associated sprag 13.

Further, the retainers 15 in the first and second embodiments and the outer retainer 47 and inner retainer 48 in the fourth embodiment may be formed of metal or resin.

The block bearings in the second embodiment of the present invention can also be incorporated in the one-way clutch 30 of the wire cage type according to the third embodiment of the present invention.

This application claims the priority of Japanese Patent Application No. HEI 10-014737 filed Jan. 12, 1998, which is incorporated herein by reference.

I claim:

1. A one-way clutch comprising plural sprags to be arranged between an outer ring and an inner ring and at least one retainer holding said sprags in place, wherein:

said retainer is provided with sprag windows for the sprags; and at least one indentation is formed in an edge of each of said sprag windows, said edge extending in a peripheral direction of said retainer, such that said edge is maintained at said indentation thereof out of contact with an opposing end face of the associated one of said sprags and is located, at a part thereof other than said indentation, at or adjacent to a center of rocking of the associated one of said sprags.

2. A one-way clutch according to claim 1, wherein said one-way clutch is provided with one retainer; each of said sprag windows in said retainer is in a quadrilateral shape, and has first opposing edges extending in said peripheral direction of said retainer and second opposing edges extending in an axial direction of said retainer; and two indentations are formed at an interval therebetween in each of said first opposing edges such that a portion of each of said first opposing edges, said portion remaining as a protrusion between said two indentations, is located at or adjacent to a center of rocking of the associated one of said sprags.

3. A one-way clutch according to claim 2, wherein said retainer is made of a metal or a resin.

4. A one-way clutch according to claim 2, further comprising block bearings arranged between said outer ring and said inner ring, and said block bearings being located at intervals therebetween as viewed in said peripheral direction of said retainer.

5. A one-way clutch according to claim 1, wherein said one-way clutch is provided with two retainers; each of said sprag windows in each of said retainers is in a quadrilateral shape, and has first opposing edges extending in said peripheral direction of said retainer and second opposing edges extending in an axial direction of said retainer; and two indentations are formed at an interval therebetween in each of said first opposing edges.

6. A one-way clutch according to claim 5, wherein said two indentations are formed so that a portion of said first opposing edges, said portion remaining as a protrusion between said two indentations, is located adjacent to a center of rocking of the associated one of said sprags.

7. A one-way clutch according to claim 5, wherein said retainers are made of a metal or a resin.

8. A one-way clutch according to claim 1, wherein said indentation operates to reduce drag torque during a slip of the one-way clutch.

9. A one-way clutch according to claim 2, wherein said two indentations operate to reduce drag torque during a slip of the one-way clutch.

* * * * *